United States Patent
Vasseur et al.

(10) Patent No.: US 11,297,079 B2
(45) Date of Patent: Apr. 5, 2022

(54) CONTINUOUS VALIDATION OF ACTIVE LABELING FOR DEVICE TYPE CLASSIFICATION

(71) Applicant: Cisco Technology, Inc., San Jose, CA (US)

(72) Inventors: Jean-Philippe Vasseur, Saint Martin d'uriage (FR); Pierre-Andre Savalle, Rueil-Malmaison (FR); Grégory Mermoud, Veyras VS (CH); David Tedaldi, Zurich (CH)

(73) Assignee: Cisco Technology, Inc., San Jose, CA (US)

( * ) Notice: Subject to any disclaimer, the term of this patent is extended or adjusted under 35 U.S.C. 154(b) by 291 days.

(21) Appl. No.: 16/404,153

(22) Filed: May 6, 2019

(65) Prior Publication Data
US 2020/0358794 A1 Nov. 12, 2020

(51) Int. Cl.
 *H04L 29/06* (2006.01)
 *G06N 20/00* (2019.01)
 *G06F 16/28* (2019.01)
(52) U.S. Cl.
 CPC ........ *H04L 63/1425* (2013.01); *G06F 16/285* (2019.01); *G06N 20/00* (2019.01); *H04L 63/20* (2013.01)
(58) Field of Classification Search
 None
 See application file for complete search history.

(56) References Cited

U.S. PATENT DOCUMENTS

| 7,760,730 | B2* | 7/2010 | Goldschmidt | H04L 41/0869 370/392 |
|---|---|---|---|---|
| 8,989,047 | B2 | 3/2015 | Kulasingam et al. | |
| 9,361,581 | B2 | 6/2016 | Cutler et al. | |
| 2017/0132525 | A1 | 5/2017 | Rozier | |
| 2017/0134232 | A1* | 5/2017 | Palanciuc | H04L 41/0816 |
| 2017/0374090 | A1* | 12/2017 | McGrew | H04L 47/2483 |
| 2018/0285745 | A1* | 10/2018 | Lu | G06N 20/00 |
| 2020/0082272 | A1* | 3/2020 | Gu | G06N 3/084 |

OTHER PUBLICATIONS

U.S. Appl. No. 16/389,013, Unpublished (filed Apr. 19, 2019), Cisco Technology Inc.
U.S. Appl. No. 16/459,834, Unpublished (filed Jul. 2, 2019), Cisco Technology Inc.
U.S. Appl. No. 16/194,666, Unpublished (filed Nov. 19, 2018), Cisco Technology Inc.
U.S. Appl. No. 16/194,442, Unpublished (filed Nov. 19, 2018), Cisco Technology Inc.

* cited by examiner

*Primary Examiner* — Cai Y Chen
(74) *Attorney, Agent, or Firm* — Behmke Innovation Group LLC; Kenneth J. Heywood; Jonathon P. Western

(57) ABSTRACT

In one embodiment, a device classification service forms a device cluster by applying clustering to telemetry data associated with a plurality of devices. The service obtains device type labels for the device cluster. The service generates a device type classification rule using the device type labels and the telemetry data. The service determines whether the device type classification rule should be revalidated by applying a revalidation policy to the device type classification rule. The service revalidates the device type classification rule, based on a determination that the device type classification rule should be revalidated.

20 Claims, 7 Drawing Sheets

CONTINUOUS VALIDATION OF ACTIVE LABELING FOR DEVICE TYPE CLASSIFICATION

TECHNICAL FIELD

The present disclosure relates generally to computer networks, and, more particularly, to the continuous validation of active labeling for device type classification.

BACKGROUND

An emerging area of interest in the field of computer networking is the "Internet of Things" (IoT), which may be used by those in the art to refer to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, window shades and blinds, doors, locks, etc.

As more non-traditional devices join the IoT, networks may eventually evolve from a bring-your-own-device (BYOD) model to a model that enables bring-your-own-thing (BYOT), bring-your-own-interface (BYOI), and/or bring-your-own-service (BYOS) paradigms. In other words, as the IoT grows, the number of available services, etc., will also grow considerably. For example, a single person in the future may transport sensor-equipped clothing, other portable electronic devices (e.g., cell phones, etc.), cameras, pedometers, or the like, into an enterprise environment, each of which may attempt to access the wealth of new IoT services that are available on the network.

From a networking perspective, the network can automatically configure access control policies, other security policies, and the like, if the device type of a particular device is known to the network. For example, the network may limit a particular type of sensor to only communicating with its supervisory device. However, with the ever-increasing number of different types of devices on a network, the lack of a ground truth (e.g., a device of type X has behavioral profile Y) makes identifying the actual type of a device challenging. Active learning approaches can help address this lack of a ground truth but can still suffer from incorrect labels being provided and lead to devices having more access on the network than they should.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
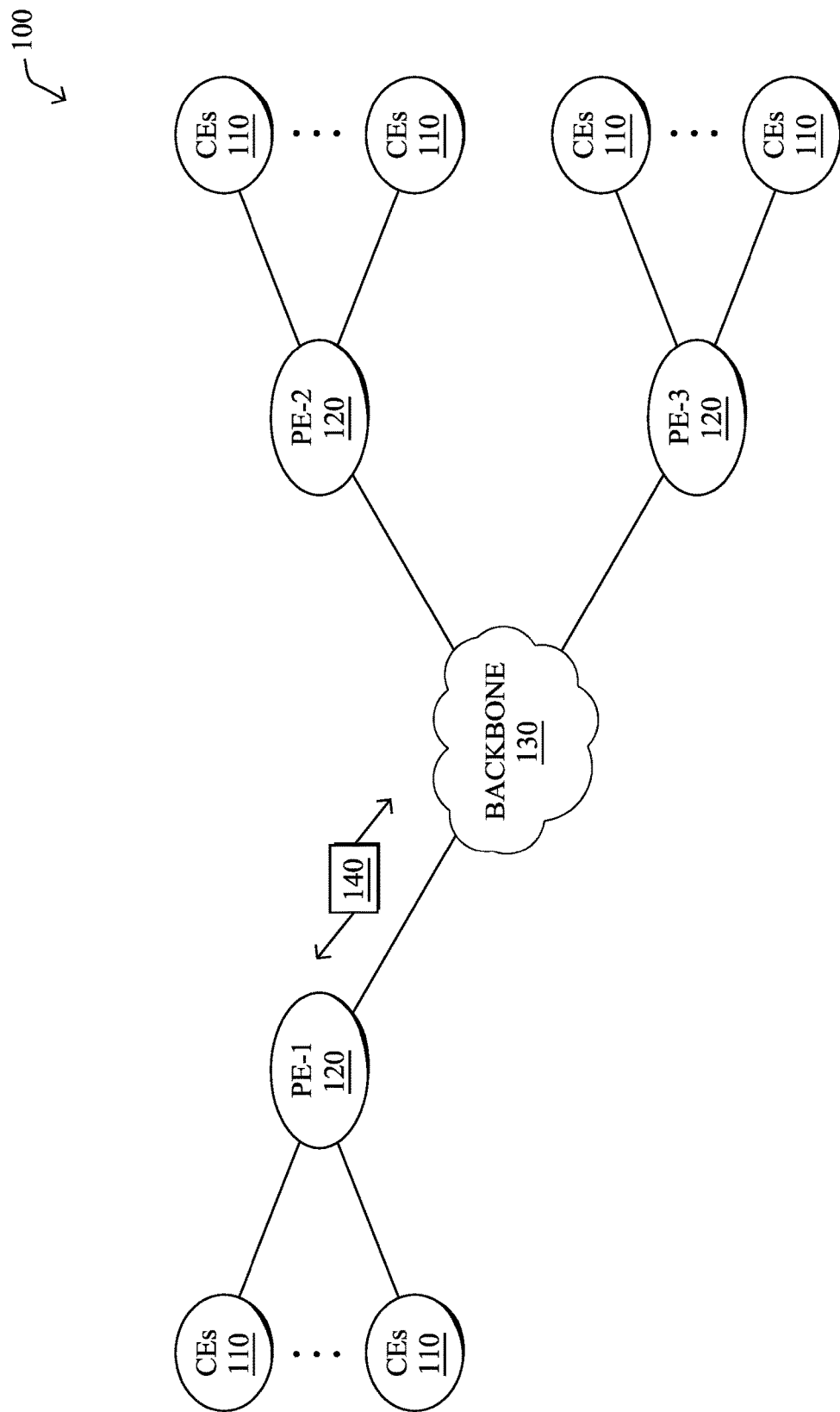
FIGS. 1A-1B illustrate an example communication network.

According to one or more embodiments of the disclosure, a device classification service forms a device cluster by applying clustering to telemetry data associated with a plurality of devices. The service obtains device type labels for the device cluster. The service generates a device type classification rule using the device type labels and the telemetry data. The service determines whether the device type classification rule should be revalidated by applying a revalidation policy to the device type classification rule. The service revalidates the device type classification rule, based on a determination that the device type classification rule should be revalidated.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/5G/LTE connection). A site of type B may itself be of different types:

2a.) Site Type B1: a site connected to the network using two MPLS VPN links (e.g., from different service providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected is to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
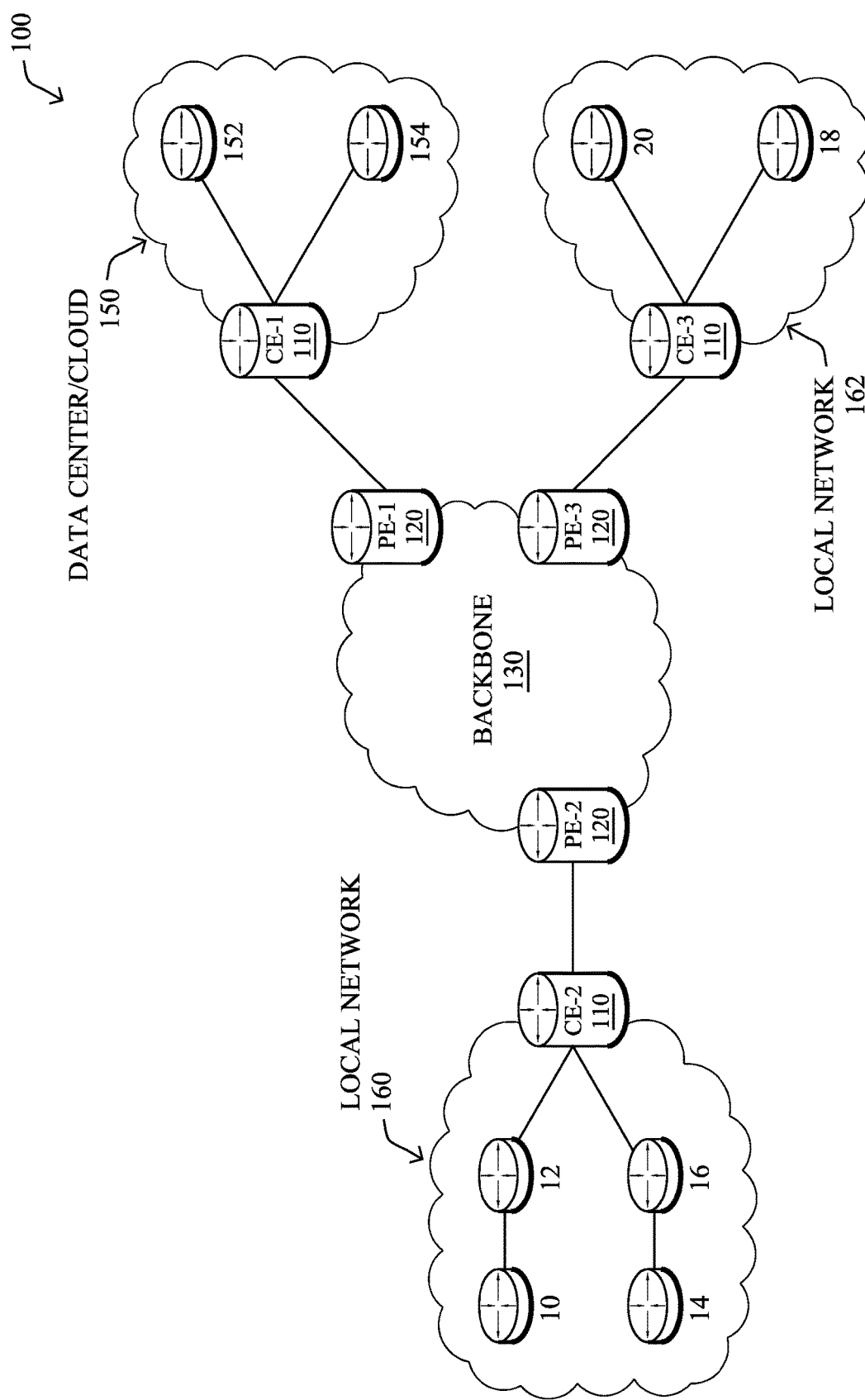

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
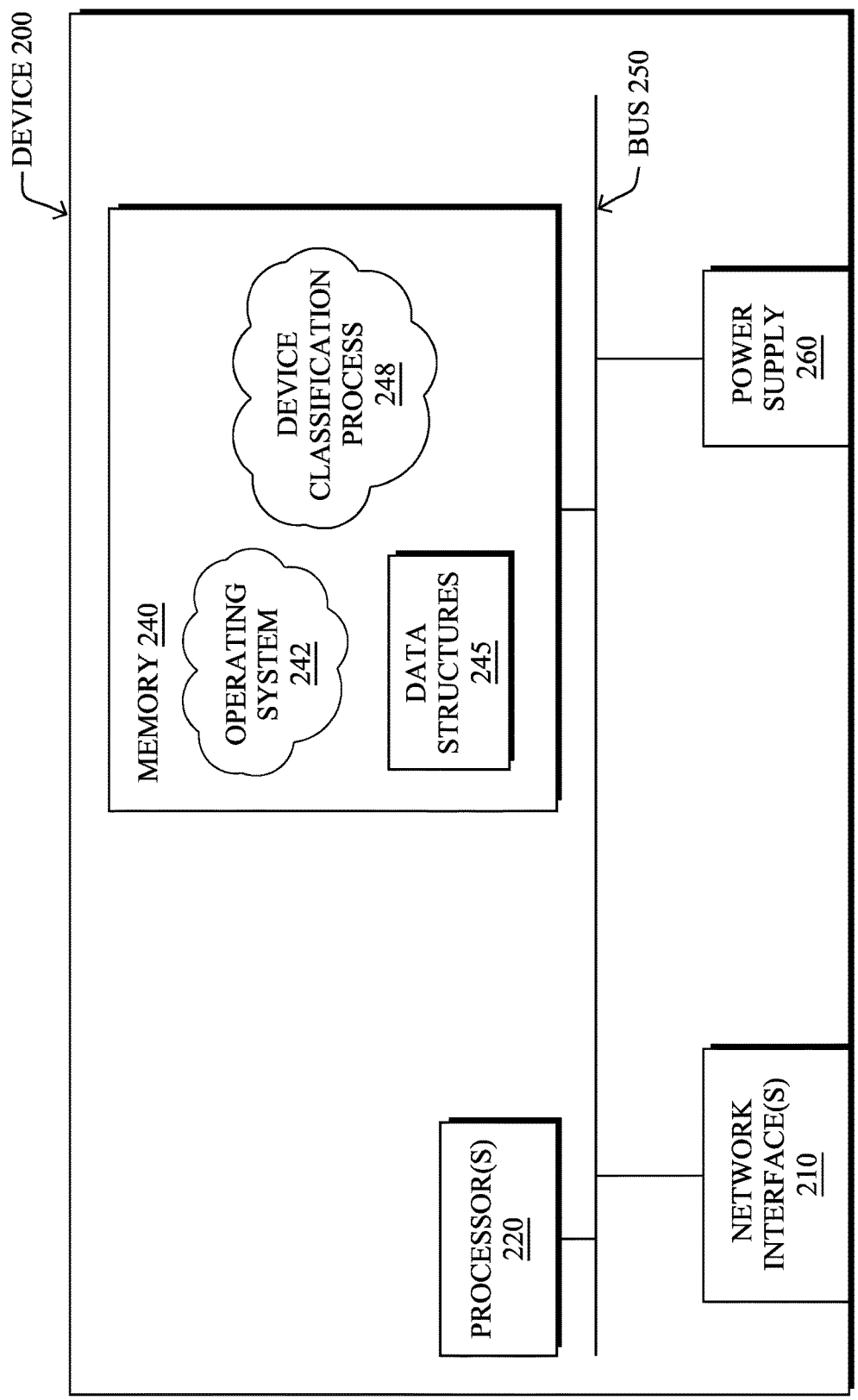
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a device classification process 248, as detailed below.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, device classification process 248 may execute one or more machine learning-based classifiers to classify a device in a network, based on its corresponding network traffic. In one embodiment, device classification process 248 may assess captured telemetry data regarding one or more traffic flows involving the device, to determine the device type associated with the device. In further embodiments, device classification process 248 may classify the operating system of the device, based on its captured traffic telemetry data.

Device classification process 248 may employ any number of machine learning techniques, to classify the gathered telemetry data and apply a device type label to a device associated with the traffic. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, device classification process 248 can use the model M to classify new data points, such as information regarding new traffic flows in the network. Often, M is a statistical model, and the cost function is inversely proportional to the likelihood of M, given the input data.

In various embodiments, device classification process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is labeled as "iPhone 6," or "iOS 10.2." On the other end of the spectrum are unsupervised techniques that do not require a training set of labels. Notably, while a supervised learning model may look for previously seen patterns that have been labeled as such, an unsupervised model may attempt to analyze the data without applying a label to it. For example, supervised learning can be used to cluster devices that behave similarly to one another, based on their captured telemetry data. Semi-supervised learning models take a middle ground approach that uses a greatly reduced set of labeled training data.

Example machine learning techniques that device classification process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as associated with a particular device type (e.g., make and/or model number, operating system, etc.). Conversely, the false negatives of the model may refer to the number of traffic flows that the model incorrectly classifies as belonging to a certain device type. True negatives and positives may refer to the number of traffic flows that the model correctly classifies as not being of a certain class or being of a certain class, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, device classification process 248 may assess the captured telemetry data on a per-flow basis. In other embodiments, device classification process 248 may assess telemetry data for a plurality of traffic flows based on any number of different conditions. For example, traffic flows may be grouped based on their sources, destinations, temporal characteristics (e.g., flows that occur around the same time or within the same time window, etc.), combinations thereof, or based on any other set of flow characteristics.

Figure 3:
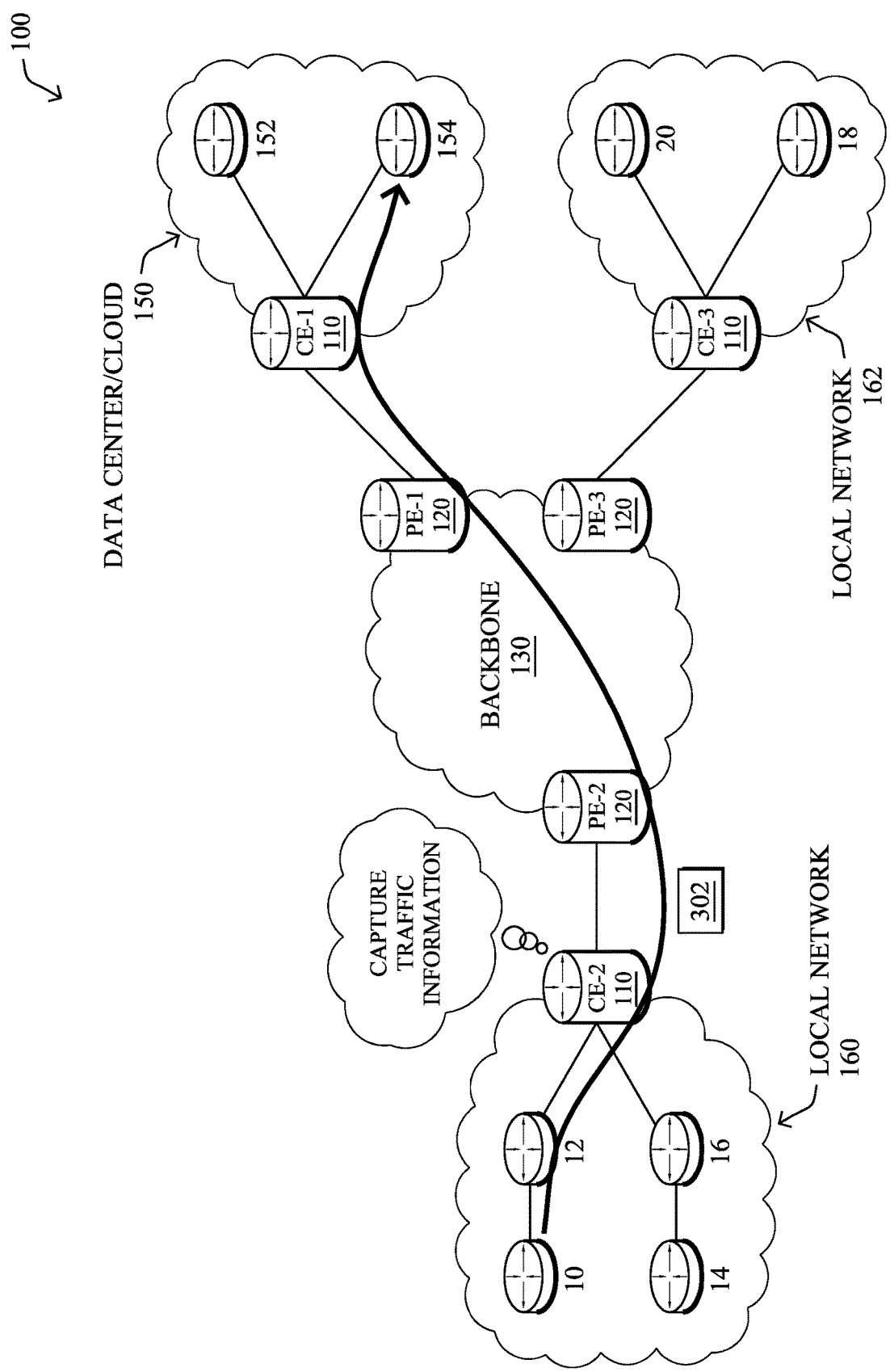
FIG. 3 illustrates an example of the capture of traffic telemetry data.

As shown in FIG. 3, various mechanisms can be leveraged to capture information about traffic in a network, such as telemetry data regarding a traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, consider the case of edge router CE-2 through which the traffic between node 10 and server 154 flows.

In some embodiments, a networking device may analyze packet headers, to capture telemetry data about the traffic flow. For example, router CE-2 may capture the source address and/or port of host node 10, the destination address and/or port of server 154, the protocol(s) used by packet 302, the hostname of server 154, and/or other header information by analyzing the header of a packet 302. Example features in the captured telemetry data may include, but are not limited to, Transport Layer Security (TLS) information (e.g., from a TLS handshake), such as the ciphersuite offered, User Agent information, destination hostname, TLS extensions, etc., HTTP information (e.g., URI, etc.), Domain Name System (DNS) information, ApplicationID, virtual LAN (VLAN) ID, or any other data features that can be extracted from the observed traffic flow(s). Further information, if available could also include process hash information from the process on host node 10 that participates in the traffic flow.

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.).

The networking device that captures the flow telemetry data may also compute any number of statistics or metrics regarding the traffic flow. For example, CE-2 may determine the start time, end time, duration, packet size(s), the distribution of bytes within a flow, etc., associated with the traffic flow by observing packets 302.

As noted above, with the proliferation of IoT devices and the bring-your-own-device (BYOD) approach, it is very difficult for an administrator to provide detailed information about each device connected to the network, such as its device type (e.g., printer, iPhone, tablet, iOS 10 device, etc.). Because of the dynamic nature of modern networks, this type of information is not static and cannot be handled manually. However, such detailed information may be needed for proper assessment of security incidents involving a particular device, to apply a network access policy to the device, for purposes of traffic shaping of traffic involving the device, and other network operations.

Figure 4:
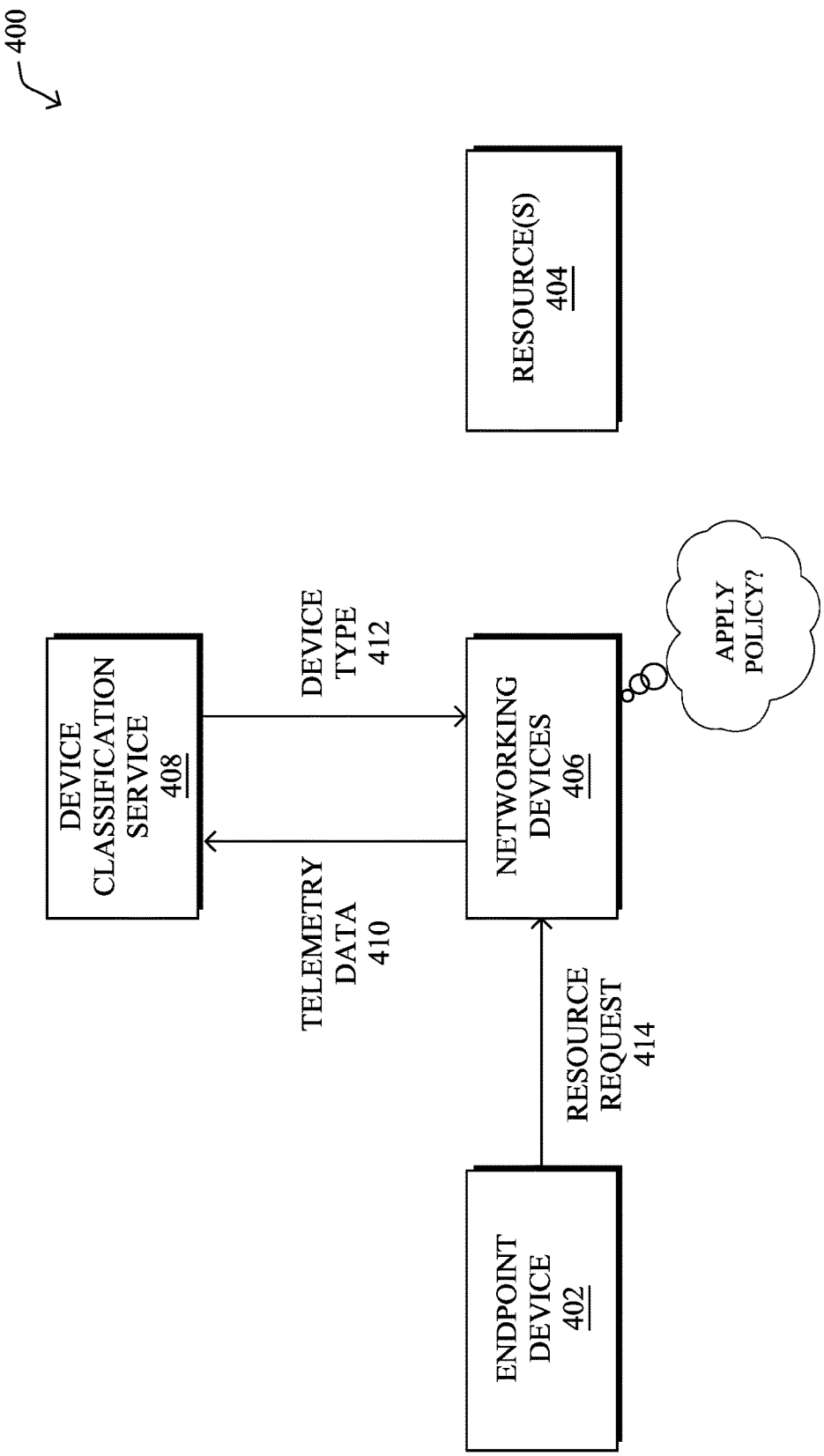
FIG. 4 illustrates an example of a device classification service in a network.

FIG. 4 illustrates an example of a device classification service in a network, in various embodiments. As shown, network 400 may generally include an endpoint device 402 (e.g., a user device, a sensor, an actuator, etc.), any number of resources 404, and any number of networking devices 406 that are configured to provide connectivity between endpoint device 402 and resource(s) 404. For example, networking devices 406 may include access points, wireless LAN controllers (WLCs), switches, routers, security devices (e.g., firewalls, etc.), access points (APs), and the like. Network resources 404 may include cloud-based services, specific servers or other endpoints, webpages, or any other resource with which endpoint device 402 could communicate.

Also as shown in FIG. 4 is a device classification service 408 that may be hosted on one or more of networking devices 406 or be in communication therewith. Service 408 may, for example, be provided through the execution of device classification process 248, described above. In general, device classification service 408 is configured to take as input telemetry data 410 captured by networking device 406 regarding network traffic associated with endpoint device 402 and, based on the captured telemetry, identify the device type 412 of endpoint device 402. For example, device type 412 may indicate the operating system (e.g., iOS, Android, etc.), manufacturer (e.g., Apple, Samsung, etc.), make (e.g., iPhone, etc.), model (e.g., 5s, 6, 7, etc.), function (e.g., thermostat, temperature sensor, etc.), or any other information that can be used to categorize endpoint device 402.

Note that the classification of endpoint device 402 by device classification service 408 can also, in some embodiments, be of varying specificity, depending on the telemetry data 410 available to service 408 and/or its degree of confidence in a particular classification. For example, device classification service 408 may determine, with a high degree of confidence, that endpoint device 402 is an Apple iPhone, but may or may not be able to determine whether device 402 is an iPhone 5s or an iPhone 6. Accordingly, in some embodiments, service 408 may also return the confidence values for the classification label(s) in device type 412 to networking device 406.

The labeling of endpoint device 402 with a device type 412 by device classification service 408 may initiate enforcement of one or more network policies by networking device 406 with respect to endpoint device 402. Such network policies may include, but are not limited to, security policies, network traffic or quality of service (QoS) policies, access polices, and the like. For example, as shown, assume that endpoint device 402 sends out a resource request 414 for a particular one of resources 404. In turn, networking devices 406 may determine whether to allow or block resource request 414 from reaching its target resource 404, based on the policy associated with the determined device type 412 of endpoint device 402. For example, if endpoint device 402 is determined to be a smart thermostat, it may be prevented from accessing certain online resources, such as an email service. Similarly, if endpoint device 402 is determined to be a safety-related sensor, a traffic or QoS policy associated with device type 412 may cause is networking devices 406 to assign a higher priority to traffic from endpoint device 402.

In general, device classification (also known as "device profiling") to identify the device type of a device under scrutiny has traditionally used static rules and heuristics for the determination. In further embodiments, the device classification can be achieved by applying a trained machine learning-based classifier to the captured telemetry data for an endpoint device. Such telemetry can also take the form of information captured through active and/or passive probing of endpoint devices, to assign a device type and corresponding host profile to a device. Notably, this probing may entail sending any or all of the following probes:

DHCP probes with helper addresses
SPAN probes, to get messages in INIT-REBOOT and SELECTING states, use of ARP cache for IP/MAC binding, etc.
Netflow probes
HTTP probes to obtain information such as the OS of the device, Web browser information, etc.
RADIUS probes
SNMP to retrieve MIB object or receives traps
DNS probes to get the Fully Qualified Domain Name (FQDN)
etc.

A device classification service may even trigger active scanning of the network and SNMP scanning when the default community string is set to public. This can be done, for example, to retrieve the MAC address of the device or other types of information. Such a variety to probes allows for the gathering of a rich set of information that can be used for device profiling. A degree of confidence can also be assigned to any such device type classifications. Note also that the device profiling can be performed at multiple points in the network, such as by wireless LAN controllers (WLCs) in addition to, or in lieu of, a centralized service.

In many networks, the number of devices that fall into the 'UNKNOWN' device type category has been found to be as high as 40%. In other words, up to 40% of the devices on a given network may not match any existing device profiling rules in use. This is expected to grow over time, illustrating the need for a more dynamic device profiling approach. Indeed, it is estimated that the number of endpoint devices will reach 3.6 billion by 2021.

A device classification service may also leverage machine learning to label endpoint devices in a network with device types. Preliminary testing has shown that machine learning is particularly well suited for this purpose, as the classifier is able to label new endpoint devices, if their behaviors are similar to those of previously labeled endpoint devices. For example, the device type classifier may include a multi-class classification model such as a decision tree-based model (e.g., a random forest, etc.) trained using telemetry samples labeled with the known device types of their associated endpoint devices. In further cases, the device type classifier may leverage a machine learning-based clustering approach that uses the traffic telemetry data as input and attempts to group similarly behaving devices by their network traffic behaviors. The classifier can then propagate the device type labels of known endpoint devices to other endpoint devices in their behavioral clusters. For example, if an endpoint device under scrutiny belongs to a particular behavioral cluster based on its traffic telemetry, and that cluster includes one or more endpoint devices known to have a particular device type, the endpoint device under scrutiny can also be labeled with that device type.

While machine learning is potentially quite powerful for purposes of performing device type classifications, such approaches also require a set of labeled examples on which the classifications are to be based. In some cases, the device classification service can use active learning whereby experts are asked to provide labels for groups of endpoint devices labeled by the classifier as 'UNKNOWN,' so that the classifier can learn new device behaviors over time. One limitation of this approach is that for the labeling to be effective, groups need to be as homogeneous as possible and actually consist of multiple endpoints corresponding to a single device type. In some contexts, the network traffic and characteristics available may be too limited to assess this correctly:

As noted, the device classification service may attempt to collect data from various sources in the network such as, but not limited to, RADIUS, policy and security systems, Netflow, port scanners, deep packet inspection (DPI) from various protocols (e.g., DNS, DHCP, HTTP, specialized protocols, etc.), and any other source that can provide telemetry data regarding an endpoint device. Although this can lead to very rich descriptions of the devices, it is very common for only a handful of sources to be configured for a given system. This may be due to technical limitations, or simply due to oversight or misconfiguration. Missing data sources lead to representations that as not as rich, and that may not be able to differentiate different device types so clearly.

More generally, traffic passively extracted from network traffic may not be sufficient to correctly differentiate all types of devices. Protocols observed may be more indicative of a certain class of device than of a particular endpoint type.

In other words, active learning of labels is susceptible to mislabeling the behaviors of some endpoint devices, either due to a lack of sufficient features or error on the part of the expert tasked with providing a device type label. For example, an iPhone may inadvertently be included in a device cluster of iPads for which labeling is needed. In such a case, labeling of the group could inadvertently lead to misclassifications of iPhones having similar behavioral profiles as that of the labeled examples in the cluster. Even if the device type labels provided by an expert are correct at the time, there is also the possibility that this labeling could become stale over time based on how the characteristics of the devices still being observed evolve over time with new generations being released Continuous Validation of Active Labeling for Device Type Classification The techniques herein allow for the revalidation of device type classification rules generated from active learning for purposes of classifying devices in a network. In some aspects, a device classification rule can be revalidated by applying a revalidation policy to the rule, such as based on the characteristics of the device type labels obtained from the active learning (e.g., the degree of consensus among the labels, etc.). In further aspects, the network authorizations of devices labeled by the rule may also be adjusted while the rule is revalidated.

Specifically, according to one or more embodiments of the disclosure as described in detail below, a device classification service forms a device cluster by applying clustering to telemetry data associated with a plurality of devices. The service obtains device type labels for the device cluster. The service generates a device type classification rule using the device type labels and the telemetry data. The service determines whether the device type classification rule should be revalidated by applying a revalidation policy to the device type classification rule. The service revalidates the device type classification rule, based on a determination that the device type classification rule should be revalidated.

Illustratively, the techniques described herein may be performed by hardware, software, and/or firmware, such as in accordance with the device classification process 248, which may include computer executable instructions executed by the processor 220 (or independent processor of interfaces 210) to perform functions relating to the techniques described herein.

Operationally, a key aspect of the techniques herein is a mechanism whereby the device clustering can be optimized without ground truth (i.e., the type of the observed devices)

such that a tradeoff is made between a notion of stability (that is, devices clustered together at time t shall remain clustered together at time t+1, t+2, . . . ) and purity (that is, different devices shall be grouped into different clusters). At the same time, the proposed techniques herein naturally allow for running the clustering on heavily compressed data, and to run the compression in a computationally efficient manner. This opens up the possibility of running the compression at the network edge and sending only the compressed information to the cloud to run the clustering and labeling, thus limiting overhead.

Figure 5:
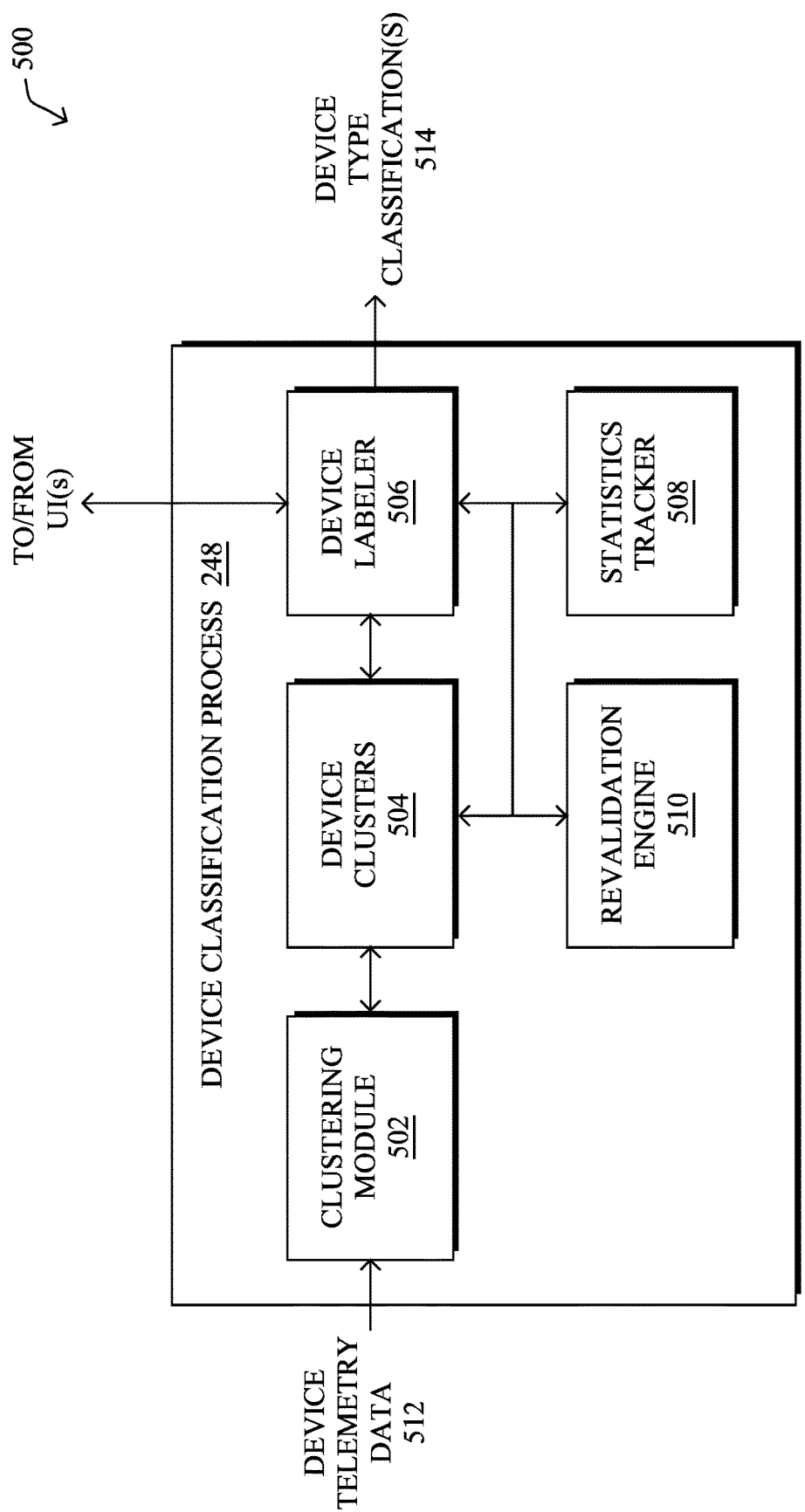
FIG. 5 illustrates an example architecture for a device classification service.

FIG. 5 illustrates an example architecture 500 for a device classification service, according to various embodiments. As shown, device classification process 248 may include any or all of the following components: clustering module 502, device clusters 504, device labeler 506, statistics tracker 508, and/or revalidation engine 510, to provide a device classification service to one or more networks. These components 502-510 may be implemented in a distributed manner or implemented on a single device. In addition, some or all of components 502-510 may be implemented as part of a monitored network (e.g., at the network edge) or part of a cloud-based device classification service. For example, in some implementations, a cloud-based device classification service may perform centralized rule generation for any number of networks that perform the classifications locally. The functionalities of the components of architecture 500 may also be combined, omitted, or implemented as part of other processes, as desired.

As shown, device classification process 248 may receive device telemetry data 512 regarding any number of devices undergoing device type classification. Such device telemetry data 512 may include, for example, the MAC addresses of the devices, traffic features captured from the devices' traffic (e.g., which protocols were used, source or destination information, etc.), timing information (e.g., when the devices communicate, sleep, etc.), and/or any other information regarding the devices that can be used to infer their device types. For example, device telemetry data 512 may take the form of a feature vector in which each dimension represents the presence or absence of a certain protocol in the traffic of the device such as, but not limited to, IPv6, IPv4, IGMPv3, IGMPv2, ICMPv6, ICMP, HTTP/XML, HTTP, etc.

In turn, device classification process 248 may output a device type classification 514 for a device under scrutiny, thereby allowing the receiving entity to apply network policies to the device, based on its device type classification 514. For example, one such network policy may cause a networking device to prevent an MRI machine from accessing the Internet via the network.

In various embodiments, the components 502-510 of device classification process 248 may leverage active learning, to assign device type classifications 514 to the devices under scrutiny. To do so, clustering module 502 may assign the devices under scrutiny to device clusters 504, based on their telemetry data 512. For example, a device cluster 504 may include those devices that exhibit the same or similar traffic or other behavioral features. If a device type is then associated with a device cluster 504, device labeler 506 may apply that type to a device as device type classification 514. In cases in which device labeler 506 is unable to classify the cluster 504 with sufficient confidence, it may send a label request to a user interface (UI), seeking active labeling of that cluster. In other words, device classification process 248 may be configured to leverage active learning, to learn the labels of unknown devices over time. Note also that the pool of device telemetry data 512 may be from any number of networks and that device labeler 506 may seek labels for a device cluster 504 from any number of experts across any number of networks, as well. Once the cluster is labeled by an expert, device labeler 506 can then apply that label to any other devices that fall within that cluster, as well.

More formally, let $D=\{D_1, D_2, \ldots, D_N\}$ denote the set of devices seen on the one or more networks under analysis by device classification process 248, each of which is identified by its MAC address or another unique identifier. For every device $D_i$ at time t, clustering module 502 may construct a feature vector $X_{i,t}$ from the telemetry data 512 for the device. Clustering module 502 may then apply a clustering algorithm, such as DB-scan, k-means, k-medoids, etc., to create a set of device clusters 504. Let $C_t=\{C_{1,t}, \ldots, C_{K,t}\}$ denote these cluster, where $C_{j,t}$ is the $j^{th}$ set of devices clustered together at time t. As would be appreciated, the number of clusters K is typically smaller, or at most equal, to the number of points N, and the collection of clusters C defines a partition of the set of devices D. In doing so, each device represented in a device cluster 504 may exhibit similar behaviors as those of the other devices in its cluster.

Clustering module 502 may perform the device clustering periodically at a relatively high frequency (e.g., hourly) or at a lower frequency (e.g., weekly). Clustering module 502 can also produce subsequent clustering either by performing new clustering from scratch or by leveraging warm-starting techniques whereby $C_{t+1}$ is obtained by running the algorithm on data corresponding to that time point, but using an initialization based on $C_t$. Whether clustering module 502 uses warm-starting can have a large impact on the 'trajectory' of the clustering and is an important design consideration.

According to various embodiments, device labeler 506 may also be configured to generate a device classification rule for a given device cluster 504, based on its associated telemetry data 512 and the device type labels obtained from experts through active learning. For example, device labeler 506 may aggregate the labels obtained from the experts, to form a finalized device type classification label for the device cluster 504, using any number of conditions (e.g., whether a threshold number of the labels agree, the majority of labels, etc.). In turn, device labeler 506 may associate this label with the telemetry data 512 representative of the device cluster 504, such as the centroid of the cluster, etc.

By generating a device classification rule, device labeler 506 can then use this rule to quickly assess the telemetry data for new devices on the network(s). In addition, device labeler 506 can also deploy the rule to any number of Identity Service Engines and/or device classification services in the network(s), to perform the device classifications locally. At this point, every new device appearing on the network and matching the rule gets identified with the corresponding device type. However, this can also lead to conflicts, particularly if the device type label of the rule was incorrect.

According to various embodiments, device classification process 248 may include statistics tracker 508 configured to keep track of various statistics regarding a device classification rule generated by device labeler 506. For example, these statistics may include, but are not limited to, any or all of the following:

Consensus Level: In some cases, statistics tracker 508 may track the degree of consensus among the device type labels obtained by device labeler 506 from active learning (e.g., from the experts via the UIs). For example, the consensus level may take the form of the percentage of experts that agree on a particular device label for a device cluster 504, along with the total number of experts that provided device type labels.

Number of Device Matches: Statistics tracker 508 may also track the number of unique devices that the device that matched the device classification rule generated by device labeler 506, since the rule was created. Statistics tracker 508 may increment each time a new device matches the rule. At the same time, statistics tracker 508 may decrement this counter every time a device already matching the rule stops matching the rule, because of an updated representation (e.g., more telemetry data 512 becomes available regarding the device). This may require the use of probabilistic data structures to be implemented efficiently in systems with lots of devices, in which case it becomes an approximate number of matches.

Number of Conflicts: Statistics tracker 508 may also track the number of times the device classification rule conflicted with another device classification rule. For example, the rule generated by device labeler 506 may occasionally conflict with a pre-configured rule on a local device classification service, access control mechanism, or the like. In some cases, the generated rule may also conflict with another rule generated by device labeler 506, as well.

Age: A further statistic that statistics tracker 508 may track is the amount of time that has elapsed since the device classification rule was created or last validated.

According to various embodiments, device classification process 248 may also include revalidation engine 510 configured to determine whether a device type classification rule generated by should be revalidated by applying a revalidation policy to the device type classification rule generated by device labeler 506. As used herein, revalidation generally refers to the act of ensuring that a classification rule generated though active learning by device labeler 506 is still valid for use in the one or more networks. If the rule validation policy dictates that the rule should be reviewed, revalidation engine 510 may then initiate this analysis, as detailed below.

Generally, a rule validation policy may be based on any of the statistics tracked by statistics tracker 508, such as the degree of consensus among the labels used to generate the rule, the number of devices that matched the rule, the number of conflicts between the rule and other rules, or the age of the rule itself. For example, one rule revalidation policy may take the form as follows:

If (Consensus_level>Threshold_1)
and/or (Num_Matches<Threshold_2)
and/or (Num_conflicts>Threshold_3)
and/or (Age>Threshold_4) then
move rule to revalidation state.

Note that default values may be configured on revalidation engine 510 and subject to changes by a user (e.g., via the UI). For example, an administrator may adjust the consensus level threshold used by revalidation engine 510 to trigger revalidation of a device classification rule.

In yet another embodiment, revalidation engine 510 may include a machine learning-based anomaly detector to track the usual/normal ranges for each rule statistic from statistics tracker 508. Doing so allows revalidation engine 510 to dynamically detect outliers, thus avoiding any cumbersome manual configuration. Thus, if a device classification rule seems to generate many more conflicts compared to other rules, or the number of devices matching the rule is abnormally low, the anomaly detector may move the rule to a revalidation state.

Once revalidation engine 510 moves a device classification rule to a revalidation state, revalidation engine 510 may also signal a change in authorization for the devices in the network(s) associated with the rule. For example, revalidation rule 510 may trigger a Change of Authorization (CoA) using the RADIUS protocol, to 'demote' the authorizations of the affected devices, until the rule used to classify those devices has been revalidated. This triggering may be performed either locally or by messaging the security devices involved.

One non-disruptive approach to adjusting device authorizations during rule revalidation may entail simply restoring the cached context related to all devices related to the device cluster 504 for which a label has been obtained through active learning by device labeler 506. In such a case, which requires process 248 to systematically stores the set of devices along with their context/telemetry data 512 for each labeled cluster 504, revalidation engine 510 may signal device labeler 506 to restart the labeling task for that cluster. In turn, device labeler 506 may restore the original device cluster 504 and perform another round of active learning by seeking labels for the cluster from the expert(s).

In further embodiments, another approach may avoid restoration of the original device cluster 504, but to select devices situated close to the cluster centroid, so as to limit the number of states to be cached. In other words, device classification service 248 may simply select a subset of the telemetry data 512 in the original device cluster 504, to seek out relabeling of those devices from the expert(s). When the corresponding cluster is a candidate for re-labeling, device labeler 506 may include an indication in the revalidation request of the underlying cause for revalidation (e.g., the rule reaching an aging limit, high number of conflicts, low number of matches, etc.).

In other embodiments, revalidation engine 510 may take a more disruptive approach whereby the original cluster 504 used to generate the rule, or even a subset thereof, is not restored for further labeling. In this case, revalidation engine 510 may revoke the device labels applied by the rule to devices in the network(s), which may lead to a COA and reduction of their network access privileges.

In an additional embodiment, revalidation engine 510 may move any device matched to the device classification rule to a pending state during which no label change is required. Then, if the device classification rule used to label those devices is not revalidated by the expert(s) within a threshold amount of time, device labeler 506 may label those devices as being of the 'UNKNOWN' device type, also leading to a potential change in their access privileges.

Revalidation engine 510 can also dynamically change the criteria that it uses to initiate revalidation of a device classification rule, in some cases. For example, if revalidation engine 510 relies on a machine learning anomaly detector to trigger rule revalidation, engine 510 may adjust its anomaly detection threshold, to increase or decrease the sensitivity of the anomaly detector. For example, if the rate at which the expert(s) reconfirm rules undergoing revalidation exceeds a certain limit, this may indicate that revalidation engine 510 is too sensitive and should adjust its anomaly detection threshold, accordingly.

Various options also exist with respect to revalidating a device classification rule generated by device labeler 506. In some embodiments, device labeler 506 may provide information regarding the rule to the UI(s), asking the expert(s)

to confirm whether the rule is indeed valid. Depending on the outcome, device labeler 506 may either decommission the rule or put it back into the pool of active rules. Alternatively, device labeler 506 may perform another round of active learning of the rule by sending information regarding the original device cluster 504, or a subset thereof, to the UI(s) for relabeling. Based on the outcome of this relabeling, device labeler 506 may either decommission the rule, put the rule back into the pool of active rules, or adjust the rule.

As noted above, some implementations provide for device classification process 248 to be executed by a cloud-based service that oversees any number of networks. In such cases, when a device classification rule is decommissioned, process 248 may propagate this event to any of the local services in the network(s) using a custom unicast or multicast message. Indeed, such information may be highly beneficial to potentially prune those rules that have been created for use in those networks. For example, if an expert A invalidates a particular rule, another expert B may also be notified of this and decide to either revalidate the rule in local use or simply remove the rule from being used locally.

Figure 6:
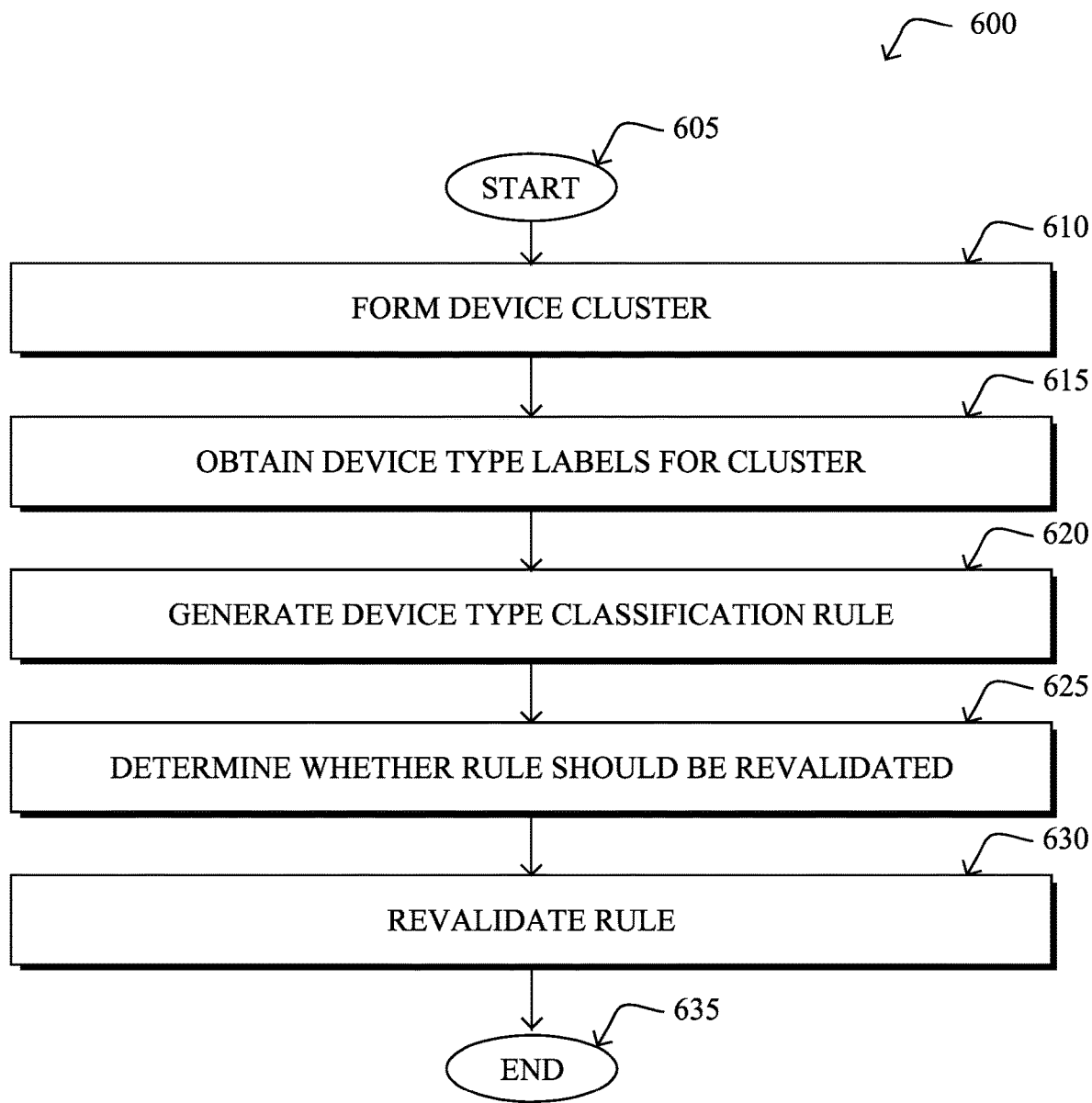
FIG. 6 illustrates an example simplified procedure for revalidating device type classification rule generated using active labeling.

FIG. 6 illustrates an example simplified procedure for revalidating device type classification rule generated using active labeling, in accordance with one or more embodiments described herein. For example, a non-generic, specifically configured device (e.g., device 200) may perform procedure 600 by executing stored instructions (e.g., process 248), to provide a device classification service to one or more networks. The procedure 600 may start at step 605, and continues to step 610, where, as described in greater detail above, the device classification service may form a device cluster by applying clustering to telemetry data associated with a plurality of devices. For example, the telemetry data may include traffic features observed for the devices, such as which protocols were used, field information, and the like, and/or any other behavioral information that can be gathered about the devices.

At step 615, as detailed above, the device classification service may obtain device type labels for the cluster formed in step 610. To do so, the service may provide information regarding the cluster to any number of user interfaces, to seek device type labels from any number of experts. For example, one expert may label the devices in the cluster as "Apple iPhone 6's," based on the telemetry data associated with the device cluster.

At step 620, the service may generate a device type classification rule using the device type labels and the telemetry data, as described in greater detail above. The rule may, for example, assign one of the device type labels from step 615 to a device, based on its associated telemetry data. Notably, the rule may specify any number of telemetry data features from the device cluster used to generate the rule. If these features are present in the telemetry data for the device under scrutiny, the rule may apply a finalized device type label to the device from among the device type labels from step 615. For example, if the majority of experts labeled the cluster of step 610 with the same device type label, the corresponding rule may apply this label to other devices that match the resulting rule.

At step 625, as detailed above, the service may determine whether the device type classification rule should be revalidated by applying a revalidation policy to the device type classification rule. For example, the service may track the characteristics of the rule including statistics such as the degree of consensus among the device type labels used to generate the rule, the number of conflicts between the rule and one or more other rules, the number of times devices matched the device type classification rule, and/or the age of the rule or amount of time since the rule was last validated. In turn, the service may compare these statistics to a revalidation policy that includes thresholds for the statistics (e.g., if the consensus is greater than a certain threshold, etc.). In some embodiments, the service may instead apply a machine learning anomaly detector to the one or more characteristics of the obtained device type labels, to determine whether revalidation is needed. In such cases, the service may also adjust a sensitivity level of the anomaly detector, based on a rate at which the device type labels are reconfirmed during revalidation of the device type classification rule and/or the rate at which experts reconfirm classification rules generated by the service.

At step 630, the service may revalidate the device type classification rule, based on a determination that the device type classification rule should be revalidated, as described in greater detail above. In one embodiment, the service may do so by re-obtaining device type labels for the device type cluster used to generate the rule. In another embodiment, the service may select a subset of the plurality of devices of the device cluster, based on their distance to a centroid of the device cluster, and re-obtaining device type labels for the selected subset of the plurality of devices. In a further embodiment, the service may simply obtain feedback regarding the device type classification rule from one or more user interfaces (e.g., by asking whether the rule is still valid). Procedure 600 then ends at step 635.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the use of active learning for purposes of classifying devices in a network by introducing a mechanism that revalidates the resulting device classification rules over time. In doing so, potential mistakes and errors made during the active learning can be rectified, so as prevent misclassified devices on the network from accessing resources that they should not.

While there have been shown and described illustrative embodiments that provide for the continuous validation of active labeling for device type classification, it is to be understood that various other adaptations and modifications may be made within the spirit and scope of the embodiments herein. For example, while certain embodiments are described herein with respect to using certain models for purposes of device type classification, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   forming, by a device classification service, a device cluster by applying clustering to telemetry data associated with a plurality of devices;
   obtaining, by the service, device type labels for the device cluster from one or more user interfaces;
   generating, by the service, a device type classification rule that assigns a particular one of the device type labels to a device using the device type labels and the telemetry data;
   determining, by the service, whether the device type classification rule should be revalidated by applying a revalidation policy to the device type classification rule; and
   revalidating, by the service, the device type classification rule, based on a determination that the device type classification rule should be revalidated.

2. The method as in claim 1, wherein the revalidation policy is based on one or more characteristics of the rule comprising one or more of: a degree of consensus among the device type labels used to generate the device type classification rule, a number of conflicts between the rule and one or more other rules, or a number of times devices matched the device type classification rule.

3. The method as in claim 2, wherein determining whether the device type classification rule should be revalidated by applying the revalidation policy to the device type classification rule comprises:
   applying a machine learning anomaly detector to the one or more characteristics of the obtained device type labels.

4. The method as in claim 3, further comprising:
   adjusting a sensitivity level of the anomaly detector, based on a rate at which the device type labels are reconfirmed during revalidation of the device type classification rule.

5. The method as in claim 1, further comprising:
   reducing authorization of devices assigned the particular one of the device type labels by the device type classification rule, after determining that the device type classification rule should be revalidated.

6. The method as in claim 1, further comprising:
   moving devices assigned the particular one of the device type labels by the device type classification rule to a pending state, after determining that the device type classification rule should be revalidated; and
   labeling the devices in the pending state as being of an unknown device type, when the device type classification rule is not revalidated in a threshold amount of time.

7. The method as in claim 1, wherein the device type classification rule is configured to assign the particular one of the device type labels to the device, based on its associated telemetry data.

8. The method as in claim 1, wherein revalidating the device type classification rule comprises:
   re-obtaining device type labels for the device type cluster.

9. The method as in claim 1, wherein revalidating the device type classification rule comprises:
   selecting a subset of the plurality of devices based on their distance to a centroid of the device cluster; and
   re-obtaining device type labels for the selected subset of the plurality of devices.

10. The method as in claim 1, wherein revalidating the device type classification rule comprises:
    obtaining feedback regarding the device type classification rule from the one or more user interfaces.

11. The method as in claim 1, further comprising:
    deploying the device type classification rule to a plurality of networks; and
    notifying at least one of the plurality of networks when the device type classification rule fails revalidation.

12. An apparatus, comprising:
    one or more network interfaces to communicate with one or more networks;
    a processor coupled to the network interfaces and configured to execute one or more processes; and
    a memory configured to store a process executable by the processor, the process when executed configured to:
       form a device cluster by applying clustering to telemetry data associated with a plurality of devices;
       obtain device type labels for the device cluster from one or more user interfaces;
       generate a device type classification rule that assigns a particular one of the device type labels to a device using the device type labels and the telemetry data;
       determine whether the device type classification rule should be revalidated by applying a revalidation policy to the device type classification rule; and
       revalidate the device type classification rule, based on a determination that the device type classification rule should be revalidated.

13. The apparatus as in claim 12, wherein the revalidation policy is based on one or more characteristics of the rule comprising one or more of: a degree of consensus among the device type labels used to generate the device type classification rule, a number of conflicts between the rule and one or more other rules, or a number of times devices matched the device type classification rule.

14. The apparatus as in claim 13, wherein the apparatus determines whether the device type classification rule should be revalidated by applying the revalidation policy to the device type classification rule by:
    applying a machine learning anomaly detector to the one or more characteristics of the obtained device type labels.

15. The apparatus as in claim 14, wherein the process when executed is further configured to:
    adjust a sensitivity level of the anomaly detector, based on a rate at which the device type labels are reconfirmed during revalidation of the device type classification rule.

16. The apparatus as in claim 12, wherein the process when executed is further configured to:
    reduce authorization of devices assigned the particular one of the device type labels by the device type classification rule, after determining that the device type classification rule should be revalidated.

17. The apparatus as in claim 12, wherein the process when executed is further configured to:
    move devices assigned the particular one of the device type labels by the device type classification rule to a pending state, after determining that the device type classification rule should be revalidated; and
    label the devices in the pending state as being of an unknown device type, when the device type classification rule is not revalidated in a threshold amount of time.

18. The apparatus as in claim 12, wherein the apparatus revalidates the device type classification rule by:
   obtaining feedback regarding the device type classification rule from one or more the user interfaces.

19. The apparatus as in claim 12, wherein the process when executed is further configured to:
   deploy the device type classification rule to a plurality of networks; and
   notify at least one of the plurality of networks when the device type classification rule fails revalidation.

20. A tangible, non-transitory, computer-readable medium storing program instructions that cause a device classification service to execute a process comprising:
   forming, by the device classification service, a device cluster by applying clustering to telemetry data associated with a plurality of devices;
   obtaining, by the service, device type labels for the device cluster from one or more user interfaces;
   generating, by the service, a device type classification rule that assigns a particular one of the device type labels to a device using the device type labels and the telemetry data;
   determining, by the service, whether the device type classification rule should be revalidated by applying a revalidation policy to the device type classification rule; and
   revalidating, by the service, the device type classification rule, based on a determination that the device type classification rule should be revalidated.

* * * * *

UNITED STATES PATENT AND TRADEMARK OFFICE
CERTIFICATE OF CORRECTION

PATENT NO. : 11,297,079 B2
APPLICATION NO. : 16/404153
DATED : April 5, 2022
INVENTOR(S) : Vasseur et al.

Page 1 of 1

It is certified that error appears in the above-identified patent and that said Letters Patent is hereby corrected as shown below:

In the Specification

Column 3, Line 48, please amend as shown:
may be connected to network 100 via PE - 3 and via a Column 8, Line 54, please amend as shown:
associated with device type 412 may cause networking Signed and Sealed this
Twenty-eighth Day of June, 2022

Katherine Kelly Vidal
*Director of the United States Patent and Trademark Office*